(12) United States Patent
Tsunashima et al.

(10) Patent No.: US 6,221,301 B1
(45) Date of Patent: Apr. 24, 2001

(54) METHOD OF PRODUCING THERMOPLASTIC RESIN FILMS AND APPARATUS FOR PRODUCING THE SAME

(75) Inventors: Kenji Tsunashima, Kyoto; Masaharu Toyama, Otsu; Katsutoshi Miyakawa, Kyoto; Shunichi Osada, Otsu; Nobutsugu Chigira, Otsu; Hiroshi Yoshimura, Otsu, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/254,430
(22) PCT Filed: Jul. 9, 1998
(86) PCT No.: PCT/JP98/03087
§ 371 Date: Mar. 9, 1999
§ 102(e) Date: Mar. 9, 1999
(87) PCT Pub. No.: WO99/02328
PCT Pub. Date: Jan. 21, 1999

(30) Foreign Application Priority Data

Jul. 9, 1997 (JP) .................................................. 9-183865
Jul. 31, 1997 (JP) .................................................. 9-219902

(51) Int. Cl.$^7$ ........................... B29C 41/26; B29C 41/46; B29C 47/88
(52) U.S. Cl. .................. 264/466; 264/210.5; 264/210.7; 264/216; 264/235.6; 264/235.8; 264/288.4; 264/290.2; 264/484; 425/66; 425/174.4; 425/174.8 R; 425/174.8 E; 425/224; 425/447
(58) Field of Search ............................. 264/210.5, 210.7, 264/216, 235.6, 235.8, 288.4, 290.2, 466, 484; 425/66, 174.4, 174.8 R, 174.8 E, 224, 447

(56) References Cited

U.S. PATENT DOCUMENTS 2,405,977 * 8/1946 Peters ................................... 264/216

FOREIGN PATENT DOCUMENTS

| 4-255322 | 9/1992 | (JP) . |
| 5-16210 | 1/1993 | (JP) . |
| 6-305013 | 11/1994 | (JP) . |
| 8-197612 | 8/1996 | (JP) . |
| 9-239812 | 9/1997 | (JP) . |

* cited by examiner

Primary Examiner—Leo B. Tentoni
(74) Attorney, Agent, or Firm—Birch, Stewart, Kolasch & Birch, LLP

(57) ABSTRACT

Method and apparatus for producing thermoplastic resin film which allows a biaxially oriented polyester film to be formed at a high speed of 400 m/min or more. In the method, a molten thermoplastic resin film is brought into contact with a cooling medium, to be cooled and solidified, for producing a cast film. The method is characterized by keeping the surface temperature of the cooling medium in the region immediately before the melt reaching position at not lower than the glass transition temperature and not higher than the melting point of the thermoplastic resin. The apparatus is characterized by a cooling medium having a heater and a cooler to ensure that the surface temperature of the cooling medium in the region immediately before the melt reaching position is kept at the requisite temperature, and by a surface temperature of the cooling drum in the region immediately before the film leaving position being maintained lower than the glass transition temperature of the thermoplastic resin.

29 Claims, 7 Drawing Sheets

METHOD OF PRODUCING THERMOPLASTIC RESIN FILMS AND APPARATUS FOR PRODUCING THE SAME

TECHNICAL FIELD

The present invention relates to a method for producing a thermoplastic resin film, and an apparatus for producing a thermoplastic resin film suitable for executing said method.

BACKGROUND ART

In the conventional methods for producing a thermoplastic resin film, a thermoplastic resin film melt-extruded from a die is brought into contact with a cooling drum, to be quickly cooled to lower than the glass transition temperature of the resin, for forming a cast film low in crystallinity, good in clarity and smooth on the surface. It is, as required, in succession stretched monoaxially or biaxially.

However, these methods have the following problem.

The maximum speed at which a film low in crystallinity, good in clarity and smooth on the surface can be obtained by bringing a molten thermoplastic resin film into contact with a cooling drum is about 40~60 m/min at the highest, since it cannot be prevented that the air is caught in the clearance between the cast film and the cooling drum irrespective of whether any casting means effective for high speed casting such as electrostatic charging, vacuum suction or pressing is used. So, the productivity is inevitably low.

DISCLOSURE OF THE INVENTION

The object of the present invention is to provide a method for producing a thermoplastic resin film excellent in both productivity and quality, by overcoming the above mentioned disadvantage, and also an apparatus for producing a thermoplastic resin film suitable for executing said production method.

The method for producing a thermoplastic resin film of the present invention to achieve the above object is a method for producing a thermoplastic resin film, in which a molten thermoplastic resin film is brought into contact with a cooling medium, to be cooled and solidified, for producing a cast film, characterized in that the surface temperature of the cooling medium in the region immediately before the melt reaching position is kept at not lower than the glass transition temperature Tg and not higher than the melting point Tm of the thermoplastic resin.

The method for producing a thermoplastic resin film of the present invention to achieve the above object as another version is a method for producing a thermoplastic resin film, in which a molten thermoplastic resin film is brought into contact with a cooling medium, to be cooled and solidified, for producing a cast film, characterized in that the surface temperature of the cooling medium in the region immediately before the melt reaching position is kept at not lower than the glass transition temperature Tg and not higher than the melting point Tm of the thermoplastic resin, and that the surface temperature of the cooling medium in the region immediately before the melt leaving position is kept at lower than the glass transition temperature Tg of the thermoplastic resin.

The apparatus for producing a thermoplastic resin film of the present invention is an apparatus for producing a thermoplastic resin film, characterized in that a cooling medium has a heater and a cooler, to ensure the surface temperature of said cooling medium in the region immediately before the melt reaching position may be kept at not lower than the glass transition temperature Tg and not higher than the melting point Tm of the thermoplastic resin, and that the surface temperature in the region immediately before the melt leaving position may be kept at lower than the glass transition temperature Tg of the thermoplastic resin.

According to the method and apparatus for producing a thermoplastic resin film of the present invention, the surface temperature of the cooling medium such as a casting drum with which the melt is kept in contact is kept at not lower than the Tg of the polymer and subsequently the surface temperature of the casting drum in the region corresponding to the melt leaving position is kept at lower than the Tg of the resin, or the melt leaves from the cooling medium after it has been crystallized on the cooling medium. Therefore, the following excellent productivity and excellent film properties can be obtained.

(1) In general, casting at a high speed of 80 m/min or more can be effected, and since stretching can be effected at a speed corresponding to the casting speed, a film can be formed at a high speed of 400 m/min or more, to greatly reduce the production cost.
(2) A film with very excellent properties as a film for general industrial use, packaging use, etc. can be provided.
(3) The method of the present invention is effective for less crystalline or amorphous thermoplastic resins and highly crystalline resins, and is high in productivity. So, it is very significant industrially in film production.

THE BEST EMBODIMENTS OF THE INVENTION

Figure 1:
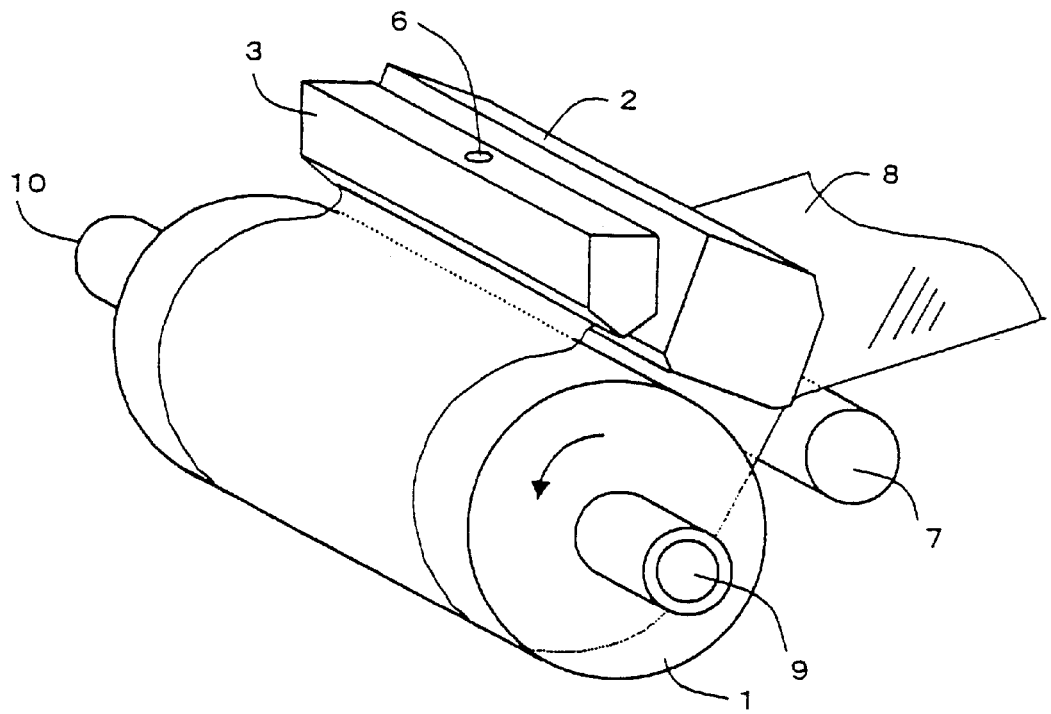
FIG. 1 is a schematic perspective view for illustrating an external heating structure which can be used in the apparatus for producing a thermoplastic resin film of the present invention.

Preferable embodiments of the method and apparatus for producing a thermoplastic resin film of the present invention are described below.

In the present invention, a thermoplastic resin refers to a resin which shows flowability when heated. Typical thermoplastic resins include polyesters, polyamides, polyolefins, polyphenylene sulfide, vinyl polymers, their mixtures and modifiction products. In the present invention, it is especially preferable to use a polyester resin, polyamide resin, etc.

A polyester is a high molecular weight polymer with ester bonds in the main chain of the molecule, and is usually synthesized by polycondensation reaction between a diol and a dicarboxylic acid, but a compound which is self-condensed, like a hydroxycarboxylic acid such as hydroxybenzoic acid can also be used.

Typical diol compounds include ethylene glycol, propylene glycol, butylene glycol and hexene glycol represented by $HO(CH_2)nOH$, and ether-containing diols such as diethylene glycol, polyethylene glycol, ethylene oxide addition products and propylene oxide addition products, and their mixtures. Typical dicarboxylic acid compounds include phthalic acid, isophthalic acid, terephthalic acid, naphthalenedicarboxylic acid, succinic acid, adipic acid, pimelic acid, suberic acid, azelaic acid, sebacic acid, dimer acid, maleic acid, fumaric acid and their mixtures.

In the present invention, especially polyethylene terephthalate (PET), its copolymers, polybutylene naphthalate (PBN), its copolymers, polybutylene terephthalate (PBT), its copolymers, polyethylene naphthalate (PEN), its copolymers, and their mixtures are preferable.

It is desirable that the monomer components of these high molecular weight polymers are repeated by 80 or more, preferably 120 or more, so called, degree of polymerization is more than 80, preferably more than 120. It is desirable that the intrinsic viscosity measured in orthochlorophenol (OCP) is 0.4 (dl/g) or more, preferably 0.55 (dl/g) or more. To achieve a higher crystallization rate, it is preferable to use a raw material with an intrinsic viscosity as low as about 0.2 to 0.5 as it is, or as a mixture with another raw material.

Of course, these high molecular weight polymers can also contain various additives such as a cyrstalline nucleating agent, slip agent, stabilizer, antioxidant, viscosity regulator, antistatic agent, colorant, pigment, etc. properly. For example, crystalline nucleating agents which can be used here include inorganic compounds such as talc, kaolin, silicon oxide, aluminum oxide, antimony oxide, titanium oxide, zinc oxide, clay, calcium carbonate, barium sulfate, strontium sulfate, zinc dust, magnesium hydroxide, calcium silicate, diatomaceous earth and carbon black, ionomers, metal salts of aliphatic carboxylic acids and sulfonic acids such as ethylenemethacrylic acid, metal salts of aromatic sulfonic acids and carboxylic acids such as styrenesulfonic acid (metals include alkali metals such as sodium and lithium, alkaline earth metals such as zinc, calcium and barium, etc.), organic compounds such as crystalline polyester compounds, etc. Of course, a polyester, the molecular ends of which become a metal salt by reaction with an alkali metal salt such as a sodium salt, is also high in crystallization rate.

In the present invention, a polyester mixture containing a crystalline polyester is preferable since the crystallization rate is higher and probably since quality and stretchability are improved. A crystalline polyester refers to a polyester having mesogen groups and showing optical anisotropy when molten, and typical crystalline polyester compounds are stated in Japanese Patent Laid-Open (Kokai) No. 7-233310, etc. In the present invention, a crystalline polyester containing 40 to 90 wt % of parahydroxybenzoic acid (HBA) as a main mesogen component is preferable.

The mesogen can be contained in any manner of random copolymerization, block copolymerization, branch copolymerization or composite copolymerization as a combination of the foregoing. In the present invention, composite copolymerization consisting of random copolymerization and block copolymerization is especially preferable. It is desirable that the melt viscosity ηm of the crystalline polyester is 100 Pa·s or less, preferably 20 Pa·s or less, more preferably 10 Pas or less, since the effects of the present invention can be promoted even if the liquid crystalline is added by a small amount. It is desirable that the crystalline polyester is contained by 0.01 to 5%, preferably 0.1 to 1% in the polyester film. If the crystalline polyester content exceeds 5%, physical properties of the polyester such as clarity, tear propagation resistance, impact resistance and abrasion resistance decline. On the contrary, if the content is less than 0.01%, crysallatization promotion effect and stretchability as the effects of the present invention cannot be achieved as intended.

It is desirable that the crystalline polyester is dispersed as a layer or needles at 0.5 μm or less, preferably 0.3 μm or less, more preferably 0.1 μm or less in the normal direction in the polyester film, since the effects of the present invention can be improved.

Furthermore, in the present invention, a polyamide resin refers to a high molecular weight polymer with amide bonds in the main chain, and typical polyamide resins include nylon 6, nylon 66, nylon 610, nylon 12, nylon 11, nylon 7, polymeta/paraxylyleneadipamide, polyhexamethylene terephthalamide/isophthalamide, their relative copolymers, mixtures, etc.

Of course, a polyamide ether obtained by copolymerizing a polyether compound such as polyethylene glycol, polypropylene glycol or polytetramethylene glycol, etc. with any of the above polyamide resins can also be used, or a polyester amide compound copolymerized with a polyester can also be used. Furthermore, a multinary copolymer unlikely to be crystallized, or an amorphous polyamide resin with many substituent groups or large substituent groups at the side chains, etc. shows especially excellent effects.

The polyphenylene sulfide resin is desirably a straight chain compound substantially not containing any branch structure.

When a molten thermoplastic resin film is brought into contact with a cooling medium, to be cooled and solidified, for producing a cast film, the surface temperature of the cooling medium in the region immediately before the melt reaching position is kept at not lower than the glass transition temperature Tg and not higher than the melting point Tm of the thermoplastic resin, to ensure that the cast film can be formed at a high speed without any entrapment of an air layer or bubble between the film and the cooling medium, and hence that the thermoplastic resin film produced may be excellent both in productivity and quality.

If the molten thermoplastic resin film is brought into contact with and caused to adhere to a cooling medium such as a drum or belt heated to not lower than the glass transition temperature Tg of the thermoplastic resin, the large adhesive strength between the melt and the cooling medium does not allow air layer or bubble to be entrapped between the melt and the cooling medium even at a high speed. So, even at a high speed of 80 m/min or more, uniform casting can be effected. The melt reaching means that the melt is brought into contact with the cooling medium.

On the other hand, if the surface temperature of the cooling medium is Tg or higher as stated above, the cast film cannot be smoothly separated from the cooling medium since the adhesive strength is large, and as a result, the obtained film is extremely degraded in flatness or cannot be easily separated in most cases. For example, if an ordinary polyester resin film is brought into contact with a cooling drum, etc. heated to not lower than the glass transition temperature Tg for casting, the adhesive strength is large, and it is difficult to separate the film from the drum, not allowing casting.

What is important here in the present invention is that if the molten thermoplastic resin film is brought into contact with the cooling drum heated, at least on the surface, to not lower than the glass transition temperature Tg of the resin, the adhesiveness between the drum and the molten film rises to prevent that the air layer or bubble such as an entrained air stream is caught, for allowing high speed casting, but that unless any technique to facilitate the separation is provided before the film leaves from the drum, high speed casting cannot be effected.

To allow separation, any technical means must be used additionally. For example;

(1) The surface temperature of the cooling medium in the region immediately before the molten film leaving position must be kept at lower than the glass transition temperature Tg of the thermoplastic resin, to lower the adhesive strength, for allowing the cast film to be separated from the cooling medium (heating and cooling method).

(2) While the film is kept in contact with the cooling medium, the surface of the film is crystallized to lower the adhesive strength before the film is separated from the cooling medium (crystallization method).

For the method (1), it is effective to let the cooling medium have a heater and a cooler, to ensure that the surface temperature of the medium in the region immediately before the melt reaching position may be kept at not lower than the glass transition temperature Tg and not higher than the melting point Tm of the thermoplastic resin, and that the surface temperature of the cooling medium in the region immediately before the film leaving position may be kept at lower than the glass transition temperature Tg of the thermoplastic resin.

The heating and cooling method (1) is described below in reference to drawings.

At first, an external heating method is described below.

In the external heating method, an external heater is installed to heat the surface of the cooling medium in the region from immediately after the molten thermoplastic resin film leaving position to immeditely before the melt reaching position.

Figure 2:
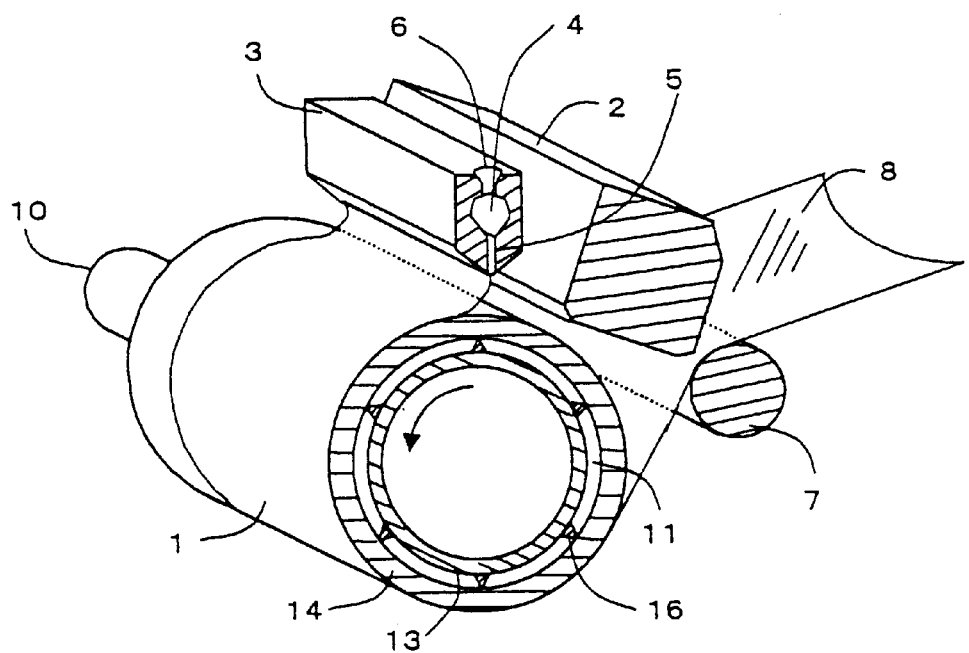
FIG. 2 is a sectional view at the central portion of the external heating structure shown in FIG. 1.

An example of the external heating method is shown in FIGS. 1 and 2. This apparatus consists of an extrusion molding die 3 for forming a molten thermoplastic resin into a film, a cooling medium 1 for cooling and solidifying the molten resin formed as a film, a separating roll 7 for separating the cooled thermoplastic resin film 8 from the cooling medium 1 and an external heater 2. The extrusion molding die 3 is not especially limited, and a T die, coat hanger die, fish tail die or a special flat die obtained by combining the features of the respective dies can be used without any problem.

Furthermore, in the present invention, it is preferable that an automatic film thickness control mechanism for controlling the film thickness by a computer is provided.

Figure 10:
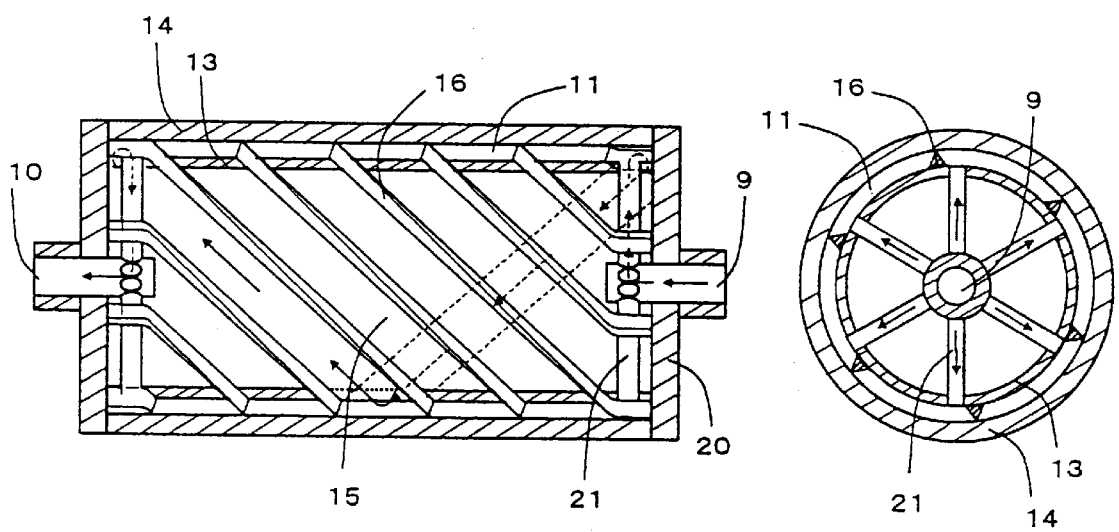
FIG. 10 is a schematic drawing showing the inside of a conventional cooling medium.
Figure 11:
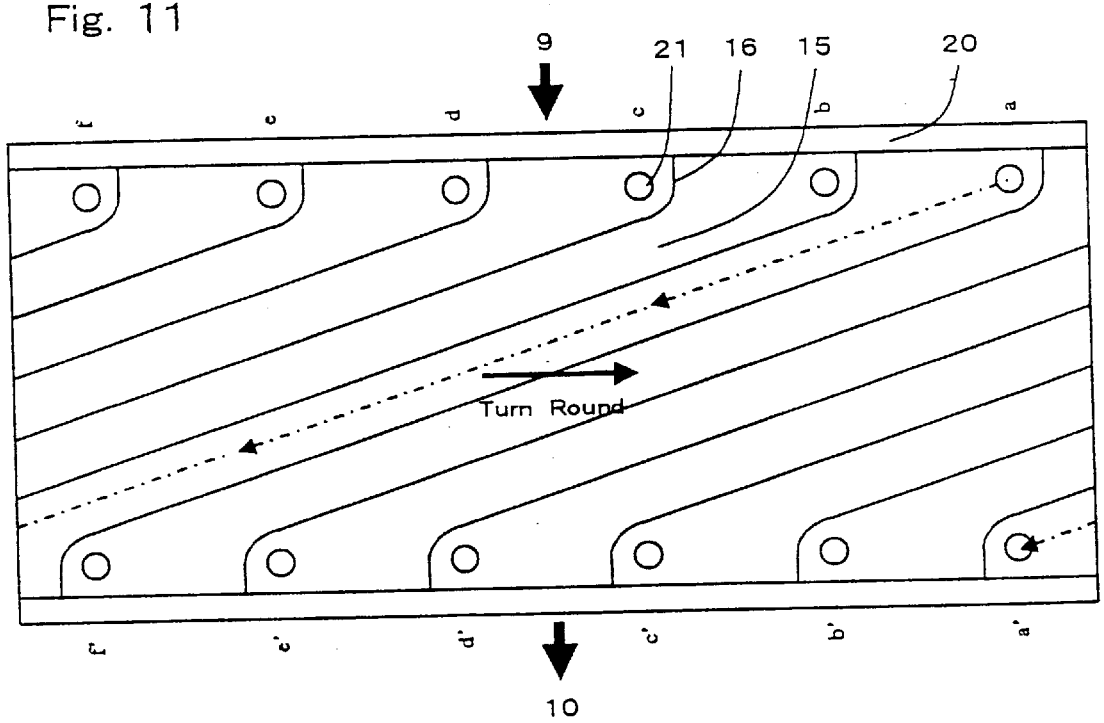
FIG. 11 is a schematic sectional view showing the internal structure of the conventional cooling medium.

As for the structure of the cooling medium 1, for example as shown in FIGS. 10 and 11, cooling water is supplied into the inside of one shaft 9 and fed, for example, in six directions by liquid heat carrier branch pipes 21, to flow in the clearance between an outer cylinder 14 and an inner cylinder 13. On the surface of the inner cylinder, spiral bulkheads 16 as many as a multiple of the number of liquid heat carrier branch pipes 21, six spiral bulkheads 16 in this example are formed, so that the heat carrier can flow in the spiral grooves 15 formed between the spiral bulkheads 16. The heat carrier is collected again by the liquid heat carrier branch pipes 21 and is discharged from the other shaft 10. The separating roll 7 is not especially limited. For example, it is preferable that the circumferential surface of the roll in contact with the thermoplastic resin film 8 is treated by hard chromium plating and mirror-finished to be 0.4 $\mu$m or less.

The external heater 2 must heat the surface of the cooling medium in the region from immediately before the molten thermoplastic resin film leaving position to immediately after the melt reaching position. That is, after the thermoplastic resin film cooled to lower than Tg has been separated from the cooling medium, the surface of the cooling medium is heated by the external heater, and when the surface temperature of the cooling medium has become Tg or higher, the thermoplastic resin delivered from the die is allowed to reach the cooling medium. It is desirable that the external heater 2 of the present invention adopts one or more in combination selected from light irradiation, energization, heating heat carrier, dielectric heating, combustion gas, etc. In this case, a heater large in heating value should be adopted, to ensure that the surface temperature of the cooling medium 1 in the region before it passes the range of the external heater 2 is greatly different from that after it passes said range for another revolution. For example, Infra-Pac, Therma-Jet, etc. produced by Impact Systems are desirable.

It is preferable that the the external heater 2 does not affect the produced film by air, water or dust, etc. It is desirable that the maximum roughness Ry of the surface of the cooling medium 1 is 0.4 $\mu$m or less to form a specular surface, for making the surface of the cast thermoplastic resin film smooth.

Furthermore, to raise the surface temperature of the cooling medium 1 within a very short period, it is desirable that the material of the cooling medium 1 has a thermal conductivity of 2.0 W/mK to 60.0 W/mK, preferably 2.0 W/mK to 16.0 W/mK. Furthermore, it is preferable to coat the surface of the cooling medium 1 with a material having a thermal conductivity of 2.0 W/mK to 20.0 W/mK. It is preferable that the coating material is a ceramic material, chromium, nickel or titanium alloy respectively with a dark color as close to a black body as possible, and that it is applied by thermal spray, plating, sputtering or vapor deposition. It is desirable that the distance between the cooling medium 1 and the external heater 2 is as short as possible to achieve a higher energy absorption efficiency. However, if the distance is too short, both of them may contact each other to cause thermal deformation. Therefore, it is preferable that the distance between both is 1 to 200 mm. A more preferable range is 5 to 50 mm. The distance of the region from immediately after the molten thermoplastic resin film 8 leaving position to immediately before the melt reaching position is short, and at a higher speed, the external heating time is shorter. So, to elongate the time, it is desirable that the diameter of the cooling medium is larger. However, if the diameter is too large, it is difficult to manufacture the cooling medium, and because of manufacturing accurcy, there is a limit. So, the diameter of the cooling medium should be in a range of 1 to 5 m, preferably 1.5 to 2.5 m.

Internal heating is described below.

A cooling medium 1 consisting of an outer cylinder 14, an inner cylinder 13 and hollow shafts 9 and 10, to allow a cooling heat carrier to pass through the hollow shafts 9 and 10 and the clearance between the outer cylinder 14 and the inner cylinder 13 has seals near the molten thermoplastic resin film leaving position and near the melt reaching position and contains an internal heater in the region from near the molten thermoplastic resin film 8 leaving position to the melt reaching position. The internal heater can adopt one or more in combination selected from light irradiation, energization, heating heat carrier, dielectric heating, combustion gas, etc., but the use of a heating heat carrier is convenient.

Figure 3:
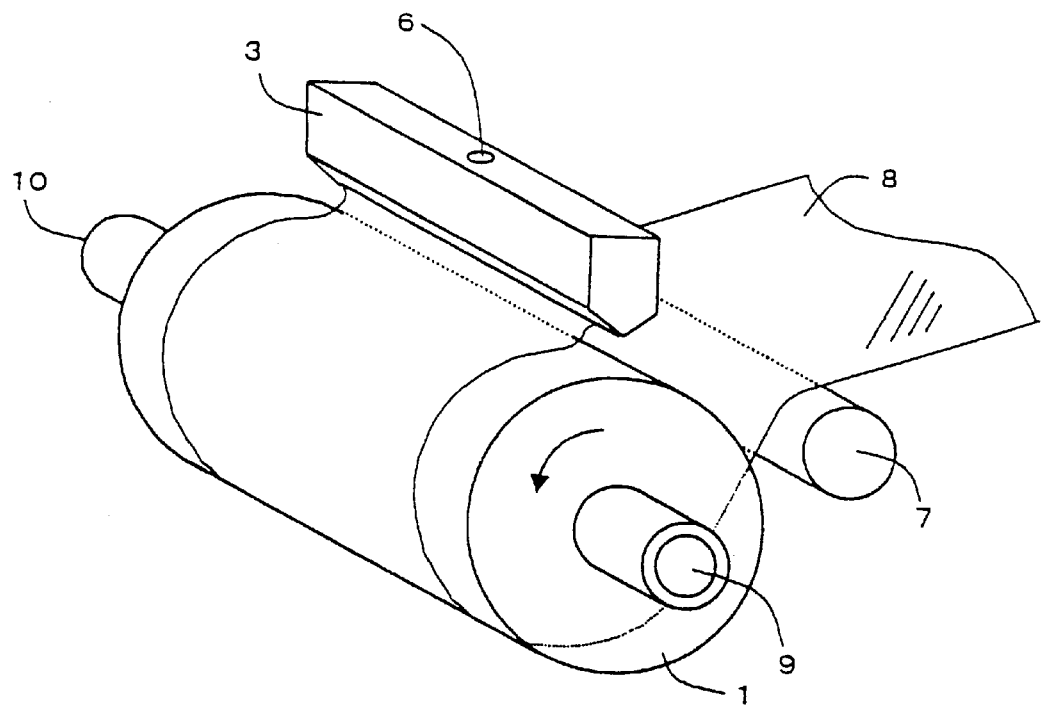
FIG. 3 is a schematic perspective view for illustrating an internal liquid feed heating structure which can be used in the apparatus for producing a thermoplastic resin film of the present invention.
Figure 4:
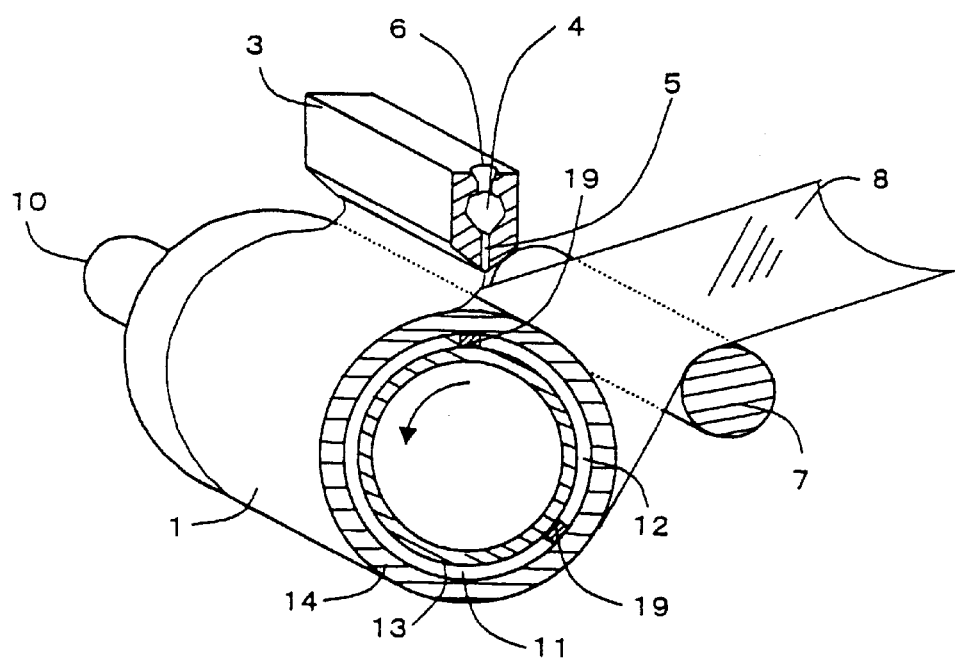
FIG. 4 is a sectional view at the central portion of the internal liquid feed heating structure shown in FIG. 3.
Figure 5:
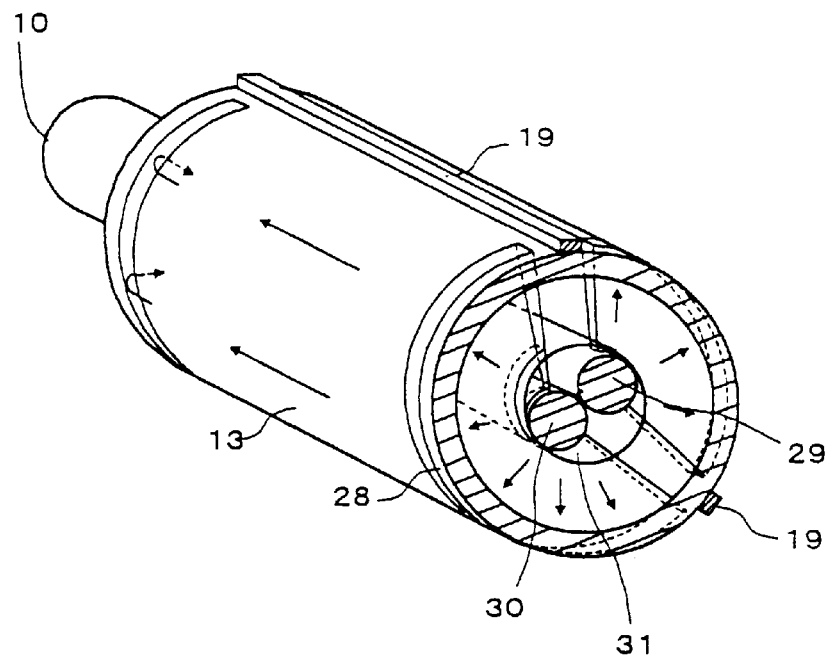
FIG. 5 is a sectional view at an end of the internal liquid feed heating structure shown in FIG. 3.

An example of the structure is shown as an outside drawing in FIG. 3, as a sectional view at the central portion in FIG. 4, and as a sectional view at an end of the inner cylinder of the cooling medium in FIG. 5. In this example, two heat carriers, i.e., a high temperature heat carrier and a low temperature heat carrier are used.

In this method, the outer cylinder 14 rotates, but the inner cylinder 13 and the shafts 9 and 10 are fixed. The shafts 9 and 10 respectively have two holes for a low temperature heat carrier pipe 30 and a high temperature heat carrier pipe 29, in which heat carriers respectively different in temperature flow. It is desirable that the heat carriers are of the same kind to avoid any adverse effect when they happen to be mixed, and especially water is most suitable. The two heat carriers fed by pumps not illustrated enter from one shaft 9, to flow into the clearance between the inner cylinder 13 and the outer cylinder 14. On the surface of the inner cylinder, heat carrier patition plates 19 are fixed to prevent that the high temperature heat carrier and the low temperature heat carrier are mixed. The heat carriers passing through the clearance between the inner cylinder 13 and the outer cylinder 14 are discharged from the other shaft 10 respectively. The flow in the drum illustrated in the drawing is one-directional, but the clearance between the inner cylinder and the outer cylinder can be partitioned as desired, to let the heat carriers flow zigzag in the circumferential direction of the drum or flow in reciprocation transversely. The temperature of the high temperature heat carrier must be Tg to Tm, and the temperature of the low temperature heat carrier must be lower than Tg. It is desirable that one of the heat carrier partition plates 19 on the surface of the inner cylinder is located near the thermoplastic resin film reaching position and that the other is located near the film leaving position.

The internal heater can be used alone, but if it is used in combination with the external heater 2, the surface temperature of the cooling medium 1 can be heated to a higher temperature, to allow casting at a higher speed.

As another version, it is possible that the coolant does not flow in the cooling medium 1 in the region from near the molten thermoplastic resin film 8 leaving position to near the melt reaching position, in other words, that no heat carrier flows in the high temperature heat carrier pipe. It is preferable for raising the surface temperature of the cooling medium, that no cooling heat carrier flows in the cooling medium in the region where the molten thermoplastic resin film is kept away from the contact with the cooling medium. That is, instead of letting the cooling heat carrier flow in the entire peripheral zone in the drum, the cooling heat carrier is allowed to flow in the cooling medium only while the molten thermoplastic resin film contacts the cooling medium, that is, only in the region from immediately after the melt reaching position to immediately before the molten thermoplastic resin film leaving position. Since no heat carrier flows in the drum in the region where the film does not contact the drum, a new heating mechanism can be installed in the drum. So, the surface temperature of the drum in this region can be set at a temperature higher than the other region of the drum.

The heating mechanism can properly adopt energized heating by an electric heater, heating by a heating heat carrier, heating by dielectric loss or heating by combustion gas, etc.

It is preferable that the material of the cooling medium of this method is higher in thermal conductivity, contrary to the external heating method. For example, a preferable thermal conductivity range is 30 W/mK to 500 W/mK, and a more preferable range is 30 W/mK to 100 W/mK. Furthermore, as in the external heating method, it is desirable that the maximum roughness of the surface of the cooling medium 1 is 0.4 m or less, to form a specular surface, and it is desirable that the diameter of the cooling medium 1 is 1 to 5 m, more preferably 1.5 to 2.5 m.

An internal embedded heating method is described below.

Figure 6:
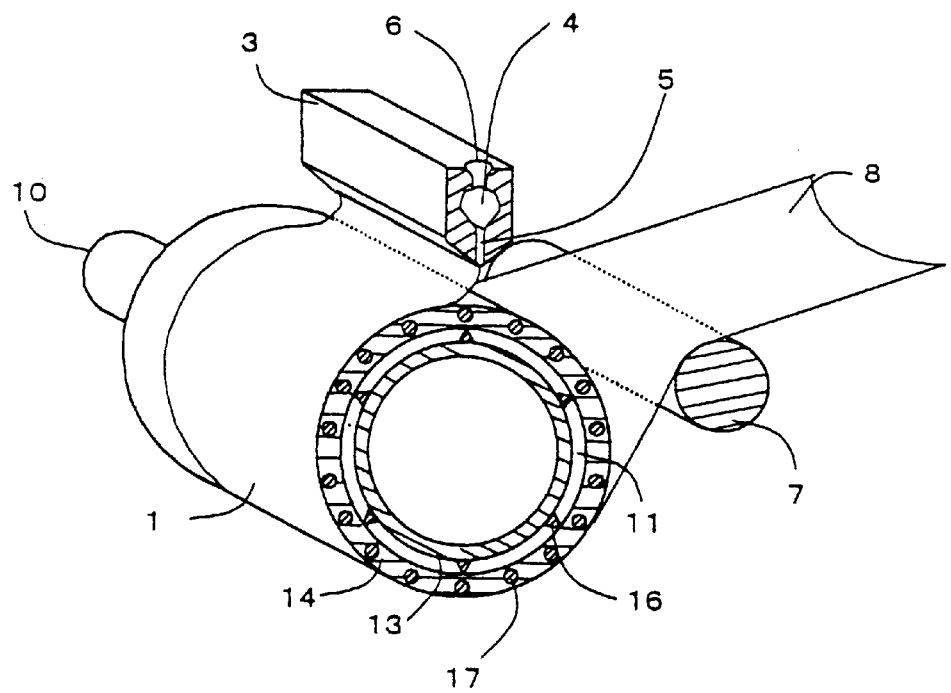
FIG. 6 is a sectional view at a central portion for illustating an internal embedded heating structure which can be used for the apparatus for producing a thermoplastic resin film of the present invention.
Figure 7:
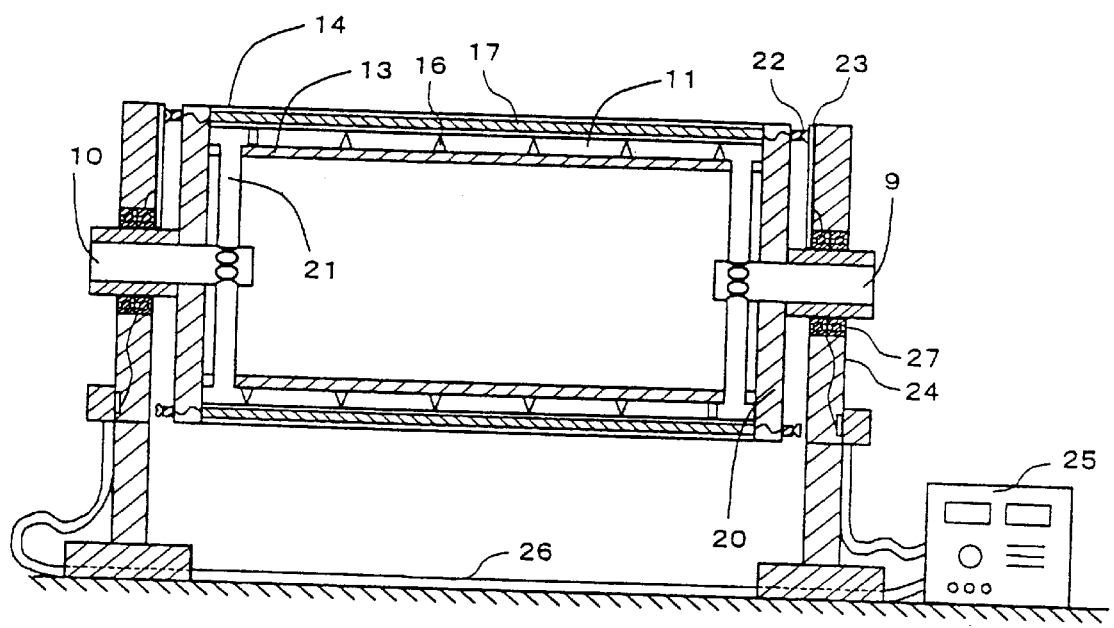
FIG. 7 is a sectional view in axial direction of the internal embedded heating structure shown in FIG. 6.
Figure 8:
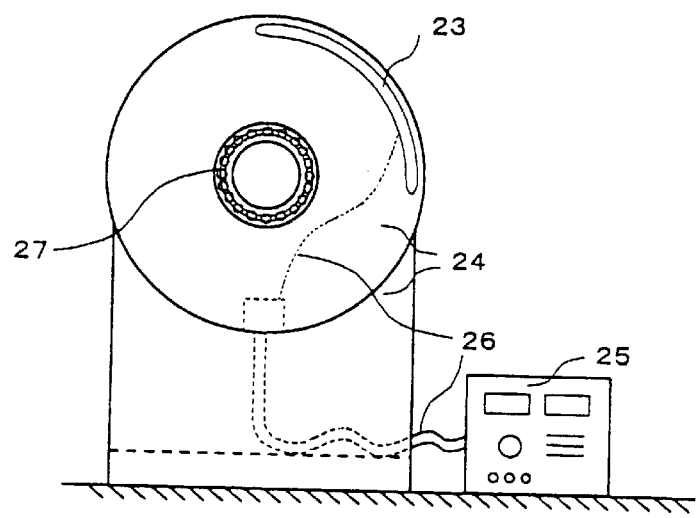
FIG. 8 is a side view of the internal embedded heating structure shown in FIG. 6.

Heating elements 17 are embedded in the outer cylinder 14 of the cooling medium 1 at almost equal intervals in the circumferential direction. An example of the structure is shown in FIG. 6. The heating elements 17 can adopt one or more in combination selected from light irradiation, energization, heating heat carrier, dielectric heating or combustion gas, etc. Especially the use of an electric heater is convenient. For energization, a power supply 25 is connected to an electrode 23 extending from near the molten thermoplastic resin film 8 leaving position to near the melt reaching position, on one shaft 9 side using a wire 26, and electric current flows through an electrode 22 on the heater side to the heating elements 17 and returns through an electrode 23 on the other shaft 10 side and a wire 26 to the power supply 25. The heating region can be changed by adjusting the lengths of the electrodes 23.

In this constitution, the electrodes are installed to let the heater 17 generate heat only in the region between the leaving position and the reaching position of the thermoplastic resin film 8, and while the cooling medium makes one revolution, the heater is switched on and off.

In this method, it is preferable that the heating elements to be embedded are installed as close to the surface of the cooling medium as possible. It is preferable that the material of the cooling medium in this method is higher in thermal conductivity, contrary to the external heating method. For example, it is desirable that the thermal conductivity is in a range of 30 W/mK to 500 W/mK, and a more preferable range is 30 W/mK to 100 W/mK. Furthermore, as in the external heating method, it is desirable that the maximum roughness of the surface of the cooling medium 1 is 0.4 $\mu$m or less, to form a specular surface, and it is desirable that the diameter of the cooling medium 1 is 1 to 5 m, more preferably 1.5 to 2.5 m.

A belt heating method is described below.

A cooling medium 1 containing an outer cylinder 14, an inner cylinder 13 and hollow rotating shafts 9 and 10, to allow heat carriers to flow in the hollow rotating shafts 9 and 10 and in the clearance between the outer cylinder 14 and the inner cylinder 13 is connected with a roll 32 installed at a certain distance away from the cooling medium 1, by a belt 18 finished to have a surface roughness of 0.2 $\mu$m or less, and the molten thermoplastic resin film 8 is formed on the belt.

Figure 9:
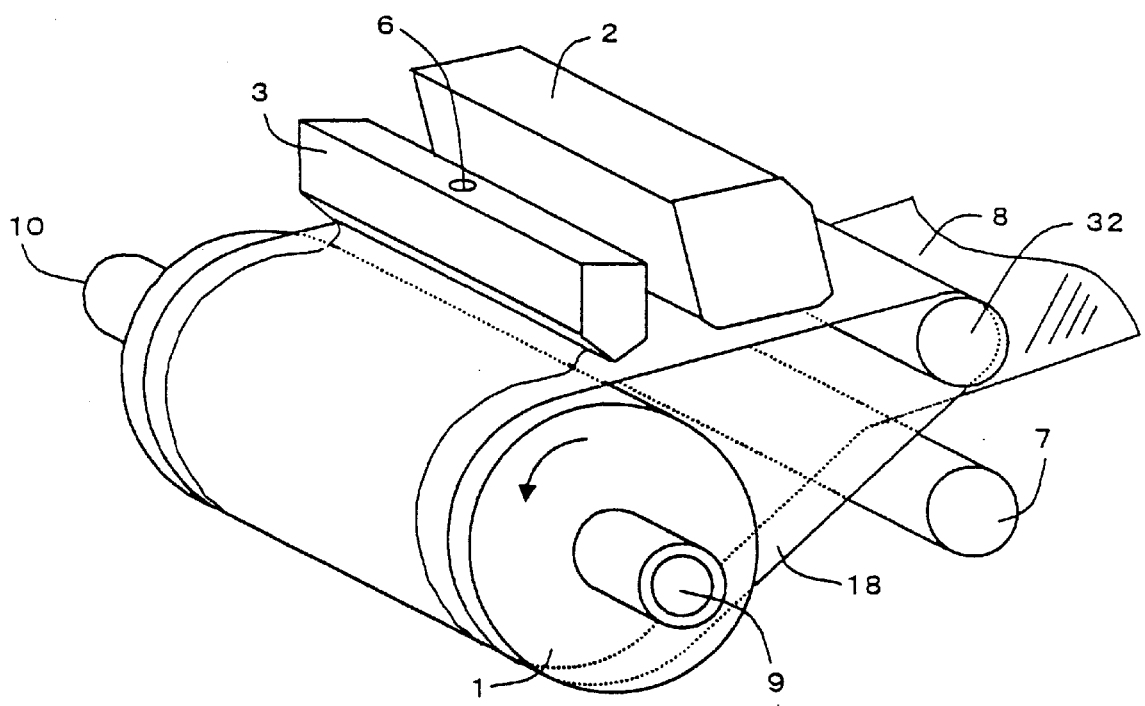
FIG. 9 is a schematic perspective view for illustrating a belt heating structure which can be used in the apparatus for producing a thermoplastic resin film of the present invention.

An example of the structure is shown in FIG. 9. In FIG. 9, the belt 18 is spread between the cooling medium 1 and the roll 32 installed at a certain distance away from the cooling medium 1. The thermoplastic resin film 8 extruded from the extrusion molding die 2 reaches the belt 18 heated to not lower than Tg and not higher than Tm. Due to the adhesivenss of the thermoplastic resin, the film 8 adheres strongly to the belt 18, to allow high speed film formation. The thermoplastic resin film 8 on the belt 18 is gradually cooled by the cooling medium 1, to lower than Tg immediately before it is separated by the separating roll 7. The film 8 separated by the separating roll 7 is carried to the subsequent steps of drawing and winding not illustrated. The belt 18 is again heated by the external heater 2 on the portion liberated from the film 8, to be heated to not lower than Tg and not higher than Tm on the surface of the liberated portion, and the thermoplastic resin film 8 reaches again the liberated portion. It is preferable that the thickness of the belt 18 is as thin as possible, to make the temperature difference before and after heating large, and is 0.1 to 3 mm. It is preferable that the material of the belt is higher in thermal conductivity, contrary to the external heating method. For example, it is desirable that the thermal conductivity is 30 W/mK to 500 W/mK, and more preferable is 50 W/mK or more. As in the external heating method, a longer belt is more effective since the heating time is longer. However, if the belt is too long, such problems as manufacturing inconvenience and meadering occur. A preferable length is in a range of 3 to 20 m. A more preferable range is 5 to 10 m. It is preferable that the maximum roughness of the surface of the belt 18 is 0.4 $\mu$m or less, to form a specular surface.

The production apparatus can adopt one or more in combination of the above mentioned external heating method, internal heating method, internal embedded heating method and belt heating method. If the apparatus is used, the surface temperature of the cooling medium in the region immediately before the melt reaching position can be heated at least by 5° C. or more, preferably 10° C. or more higher than that in the region immediately after the molten thermoplastic resin film leaving position. As a result, the high adhesive strength required for adhesion can be obtained to allow high speed casting. Thus, the thermoplastic resin film can be produced at a lower cost.

In the crystallization method (2), the molten thermoplastic resin film is brought into contact with a cooling medium such as a drum or belt heated to a temperature of not lower than the glass transition temperature Tg, preferably near the melt crystallization temperature Tmc, so that the resin film surface can be crystallized by 5% or more, preferably 10% or more while it is kept in contact with the cooling medium, to allow easy separation. Therefore, this method is effective for nylon resins and polyolefin resins relatively high in crystallization rate. Since the film is allowed to adhere at a cooling medium temperature of Tmc far higher than Tg, a very high adhesive strength can be obtained, to allow high speed casting of 80 m/min or more, preferably 100 m/min or more. In addition, the obtained film is excellent in surface smoothness and slipperiness, also excellent in thermal dimensional stability, free from the rise at the edges (high edges) at the time of slitting and excellent in thermal formability. If the thermoplastic resin film is brought into contact with a cooling drum, etc. heated to a casting temperature not lower than Tmc higher than the glass transition temperature Tg, it becomes difficult to separate the film from the drum, not allowing casting.

Therefore, what is important in the present invention is that the molten thermoplastic resin film is allowed to reach the cooling drum heated to not lower than the glass transition temperature Tg, preferably not lower than Tmc, to improve the adhesiveness between the drum and the molten film for preventing air such as an entrained air stream from being caught, and that while the thermoplastic resin film temperature on the drum is near the melt crystallization temperature Tmc of the resin, i.e., at the temperature most likely to cause crystallization, the film is crystallized at least in the surface layer, to be separated from the drum. In this case, the surface layer crystallization degree is 5% or more, preferably 10% or more. If the surface layer crystallization degree is less than 5%, it becomes often difficult to separate the film from the casting drum. So, it is preferable that the casting drum temperature is set at near the melt crystallization temperature Tmc of the polymer. Of course, crystallizing the entire film is preferable for obtaining a film excellent in thermal dimensional stability, free from the rise at the edges (high edges) at the time of slitting and excellent in thermal formability, but may not be preferable since the properties do not perfectly agree with the properties of convenionally used films, to limit the applications. For this reason, it is practical to crystallize the surface layer only. It is preferable that the thickness of the surface layer in this case is as thin as possible, say, 1 $\mu$m or less. More preferable is 0.1 $\mu$m or less. There is no special upper limit of crystallization degree, and the crystallization can be effected as desired to suit the desired quality to be obtained. However, the upper limit seems to be 30~50%.

The present invention can also be effected as follows. A laminate melt consisting of a thermoplastic resin film and another thermoplastic resin film higher in crystallization rate than said thermoplastic resin film is brought into contact with a cooling drum, in such a manner that the resin filmer higher in crystallization rate may contact the cooling drum, for cooling and crystallization, and solidification, and subsequently the more highly crystalline resin film is separated. For example, for a polyester resin, a polymer higher in crystallization rate than the polyester, for example, a polyolefin such as polyethylene, polypropylene, ethylene propylene copolymer, methylpentene polymer or polyoxymethylene can be laminated and separated, but the combinations are not limited to these.

The method for producing a thermoplastic resin film of the present invention is described below more specifically.

The thermoplastic resins which can be used as the raw material for melt extrusion include polyesters, polyamides, polyolefins, polyphenylene sulfide, vinyl polymers, their modification products, their copolymers and blends with any other compound.

In the present invention, if an amorphous thermoplastic resin is used as the raw material, it is preferable to separate by the heating and cooling method (1), and if a crystalline thermoplastic resin is used as the raw material, it is preferable to separate by the surface crystallization method (2).

Of course, the high polymer resin can contain desired additives. For example, a raw material containing an inorganic compound such as silicon oxide, magnesium oxide, calcium carbonate, titanium oxide, aluminum oxide, crosslinked polyester, crosslinked polystyrene, mica, talc or kaolin or an organic compound such as ethylenebissterylamide or ionic high molecular ionomer or, a raw material once molten, or a raw material containing the raw material recovered from the film of the present invention, etc. is melt-extruded in a nitrogen stream or in vacuum not to lower the molecular weight, for example, the intrinsic viscosity [$\eta$] by a single-screw extruder, double-screw extruder, vent extruder or tandem extruder, etc. The melting temperature is usually not lower than the melting point of the thermoplastic resin, but the so-called supercooling extrusion method of once melting at not lower than the melting point of the thermoplastic resin and cooling to a temperature of lower than the melting point and not lower than the melt crystallization temperature Tmc can also be adopted. The supercooling extrusion is effective for decreasing the thermal decomposition and gelation of the resin, and the low molecular oligomer is not newly produced but decreases on the contrary, to give an effect that casting is easier with the drum less soiled. In this case, it is preferable to use any of various filters such as a sintered metal, porous ceramic material, sand or wire gauze, etc. for removing foreign matters. If the draw-down ratio (=die lip interval of die/ thickness of film extruded) at the time of extrusion from the die is 7 or more, preferably 10 or more, the film obtained is likely to be less irregular in thickness and good in clarity.

It is obvious that the melt extruded like this can be a single film, or a laminate film with another layer laminated at least on one side of the thermoplastic resin film, or a laminate film in which a film of a polymer other than the resin used in the base layer is laminated at least on one side.

If a drum is used as the cooling medium, a special drum must be used in the case of method (1). That is, a structure in which cooling water can be fed in the region corresponding to ¾ of the circumferential length of the drum to be kept in contact with the molten film but cannot be fed in the other region corresponding ¼ not to be kept in contact with the film can be used. More preferably, a structure in which an electric heater is installed in the entire circumference near the surface layer of the drum but can be energized only in the ¼ region can be used. In this case, it is effective to apply external heating energy such as radiation heat of far infrared rays, infrared rays, high velocity electron stream of plasma, etc., or combustion gas, to the ¼ region of the surface layer from outside. The thermoplastic resin film contact distance along the circumference of the drum ranging from the position where the melt contacts the drum for the first time to the position where the film leaves from the drum is about ¾ of the circumferential length of the drum in ordinary casting. So, the heating and cooling structure as described above is adopted. The proportions of heating and cooling zones can, of course, be decided as desired to suit the heating and cooling methods adopted.

The surface temperatrue of the drum in the region immediately before the position where the molten thermoplastic resin reaches teh cooling drum must be not lower than the glass transition temperature Tg and not higher than the melting point Tm of the thermoplastic resin. In the case of the method (1) it is preferable that the surface temperature is (Tg+5° C.)~(Tg+100° C.). A more preferable range is (Tg+25° C.)~(Tg+50° C.). In the case of the crystallization method (2), the melt is caused to adhere to the casting drum heated to a temperature near Tmc, to be cooled and solidified. If the melt is caused to adhere according to the method (1), the film cannot be separated from the drum at the same surface temperature, but in the case of the method (2), the film crystallized in the surface layer of the resin can be separated from the drum. So, in the case of (1), the surface of the drum is cooled to not higher than the Tg of the resin in the region corresponding to as large as about ¾ of the circumferential length of the drum starting from the position where the melt reaches the drum, to ensure that the film can be separated. Thus a cast film can be obtained. Of course, it is not known that a cast film can be obtained by bringing a molten thermoplastic resin into contact with a casting drum heated on the surface to not lower than the glass transition temperature Tg and not higher than the melting point Tm of the thermoplastic resin, in the region immediately before the melt reaching position, for cooling and solidifying the resin. If the surface temperature of the drum is lower than Tg, a high adhesive strength cannot be obtained, and even if any other contact improving means such as electrostatic charging or air knife method is used together, the molten polyester film cannot be caused to sufficiently adhere to the cooling drum rotating at a high speed of 80 m/min or more. As a result, an entrained air stream containing air is caught, and a film with a smooth surface cannot be obtained. If the surface temperature exceeds the melting point Tm, the film cannot be solidifed by cooling. Any other contact improving means such as air chamber method, air knife method, press roll method or vacuum suction method can be used together at the time of casting.

After the melt is kept in contact with the drum for casting and before it is separated, the surface temperature of the casting drum is cooled to lower than Tg, to allow separation from the casting drum. For this purpose, it is effective to feed a cooled heat carrier, usually water into the cooling medium in the region from immediately after the melt reaching position to immediately after the molten thermoplastic resin film leaving position. If a drum is used as the cooling drum, it is preferable that the diameter of the casting drum is 1.2 m or more, since a long time can be taken for cooling and also for raising the surface temperature to not lower than Tg, and since the operation convenience is excellent. Preferable is 1.5 m or more, and more preferable is 2.0 m or more. Of course, a plurality of drums, belts, water tanks, etc. different in surface temperature, material, etc. can also be used.

The cooling method using a belt as the cooling medium is a preferable casting means in the present invention, since the temperatures at the reaching position and the leaving position can be easily changed.

It is preferable that the surface material of the cooling medium of the present invention is good in external energy asborption efficiency, and can be a metal or ceramic material, etc. colored black, etc. A typical colored chromium plating technique is the stainless steel surface coloring technique developed at Birmingham Laboratories of International Nickel (INCO). In this technique, a chromic acid sulfuric acid mixed solution is heated to 70~90° C., and stainless steel is dipped in the solution. By adjusting the dipping time, such colors as brown, blue, gold, red, purple and green can be obtained. To improve the abrasion resistance of the film, it is practical to cover the surface by chromium plating in a chromic acid sulfuric acid phosphoric acid mixed solution. As the metallic material, stainless steel (SUS) and chromium plating are preferable in view of durability, surface smoothness, etc. The chromium plating can be the well-known crystalline chromium plating, but in view of freedom from cracks, high hardness, very high smoothness, thin film, etc., amorphous chromium plating is especially preferable for the method for producing a polyester film of the present invention. Amorphous chromium plating methods are, for example, described in Japanese Patent Laid-Open (Kokai) No. 3-115596, "Metals (in Japanese)", April issue, P. 75 (1989), etc. The maximum roughness Ry of the surface of the cooling medium is 0.4 $\mu$m or less, for such reasons that low molecular compounds such as monomers and oligomer are less likely to adhere at the time of casting, that surface defects such as craters are less likely to be formed on the surface even by high speed casting, that the obtained film becomes smooth on the surface and that stretchability in a subsequent step is improved. Preferable is 0.2 $\mu$m or less, and further more preferable is 0.15 $\mu$m or less. Most preferable is 0.10 $\mu$m or less. If the cooling medium is a drum, it is preferable especially in view of thickness uniformity that the position at which the molten film reaches the cooling medium is a position after the top of the drum in progression direction or vertical tangential line position, since the edges and the central portion of the film can be brought into contact with the drum simultaneously.

The cast film is stretched as required. Any of various stretching methods such as longitudinal monoaxial strength, lateral monoaxial stretching, sequential biaxial stretching and simultaneous biaxial stretching can be adopted. In the case of simultaneous biaxial stretching, the clip drive can be effected by the pantograph method, screw method or linear drive method, etc. In the present invention, especially the linear drive method is preferable for the method for producing a thermoplastic resin film of the present invention in view of easiness of stretching ratio adjustment, high speed running, excellent productivity, etc. The stretching temperature is not especially limited and can only be required to be not lower than the glass transition temperature Tg of the thermoplastic resin, and any desired temperature can be selected as required. The stretching ratio in one direction is 2 to 8 times, preferably about 3 to 6 times. After or during the stretching, the film can be properly heatset as required.

The thermoplastic film produced by the method or apparatus of the present invention can be a single-layer film, but it can be laminated on another thermoplastic polymer layer, for example, a layer of a polyester, polyamide, polyolefin, polyvinylidene chloride, acrylic polymer or modified polyvinyl alcohol, etc. directly or through an adhesive layer, etc. In the case of a laminate film consisting of three or more thermoplastic layers, if the reclaim polymer etc. are mixed in the central layer, productivity and quality can be improved.

A plurality of thermoplastic resin films identical or different physically, chemically or in composition can also be overlaid, stretched and, as required, heatset with an air layer kept between the respectively adjacent films, and the respective films can be separated. Such a highly efficient multiple film forming method can also be adopted in the present invention.

When the thermoplastic resin used in the method of the present invention is, for example, a polyester resin, the obtained film can be used for conventional applications such as packaging, magnetic recording, electric application in capacitors, electric insulators, etc., graphic application and aceptor paper application, and also effectively for new applications requiring excellent thermal dimensional stability, formability, shape stability and high toughness.

<Methods for Measuring Physical Values>

(1) Intrinsic Viscosity [η] of polyester resin

Obtained from the following formula according to ASTM D 1601 using o-chlorophenol as the solvent at 25° C.

$$[\eta]=1im[\eta sp/c]$$

The specific viscosity ηsp is obtained by subtracting 1 from the relative viscosity ηr. c stands for concentration (g/dl). The intrisic viscosity [η] is expressed in dl/g.

(2) Surface Roughness Ry

Measured according to JIS B 0601-1994 with a reference length of 0.25 mm and an evaluation length of 1.25 mm at room temperature.

(3) Plating Surface

The surface is observed by a differential interference microscope. The magnification of observation is about 100 to 500 times. If aluminum vapor deposition is used as required, the surface may be easier to see. Surface defects such as cracks can be identified at a glance.

(4) Adhesiveness Between Cast Film and Drum

A case of freedom from any air caught on the casting drum, hanging or any other casting defect is expressed by ○, and a case of showing any visually observed defect is expressed by X.

(5) Cast Film Surface

Light is applied to a 10 m² or more surface area of the cast film, and the reflected light is visually obserfved, to judge whether surface projections and depressions such as craters exist. The criterion is as follows:

Symbol Adhesiveness between cast film and drum

○ No projection or depression at all on the surface

Δ Only projections and depressions of less than 0.1 μm in depth can be seen on the surface, and they can be eliminated by stretching.

X Projections and depressions are seen on the entire surface.

(6) Separatability Between Cast Film and Drum

This is the easiness to separate from the casting drum. The criterion is as follows:

Symbol Separatability between cast film and drum

○ Can be naturally separated from the casting drum.

Δ Can be separated from the casting drum at a force of 100 g/cm or more.

X Difficult to be separated from the casting drum.

(7) Thermal Properties

A differential scanning calorimeter DSC is used to heat 10 mg of a sample in a nitrogen stream at a rate of 20° C./min. The initiation temperature at which the base line changes is identified as Tg; the exothermic peak temperature by crystallization, as Tcc; and the endothermic peak temperature caused by crystal melting, as Tm. After completion of melting, the sample is kept heated, kept at 290° C. for 3 minutes, and cooled at 10° C./min. The exothermic peak temperature by crystallization is identified as Tmc.

ΔTcg and ΔTmmc are respectively ΔTcg=Tcc−Tg, and ΔTmmc=Tm−Tmc.

To obtain the thermal properties of a resin used by erasing such history as orientation of a sample, the sample is heated in a nitrogen stream at a rate of 50° C./min, kept at 290° C. for 3 minutes, and quenched by liquid nitrogen. Then, in the 2nd run, the repsective properties are measured.

Examples of the present invention and comparative examples are described below.

EXAMPLE 1

As the thermoplastic resin, polyethylene terephthalate (PET) (0.65 in intrinsic viscosity [η], 69° C. in Tg, 125° C. in cold crystallization temperature Tcc, 265° C. in melting point Tm, and 210° C. in Tmc) was used. As an additive, spherical silica with an average grain size of 0.2 μm was added by 0.1 wt %. The PET resin was dried to a water content of 20 ppm or less, supplied into a melt extruder with a screw diameter of 250 mm, molten at 285° C., filtered by a fiber metal filter for removing foreign matters of not smaller than 7 μm, and introduced into a T die, and the melt was extruded as a film. While electrostatic charges were applied to the film, the film was brought into contact with a casting drum rotating at a drum surface speed of 100 m/min, to be cooled. The adhesiveness to the casting drum, separatability from the casting drum, and the surface of the obtained film were good.

In this case, the casting drum used had a special structure which kept the surface temperature of the drum at 105° C. in the region immediately before the molten PET reaching position, and to keep the surface temperature of the drum at 45° C. in the region immediately before the film leaving position. That is, the surface of the drum was heated by a radiation heater in the circumferential region where the PET film was not kept in contact with the drum (external heating method), and cooling water was not fed in the drum in the region (a kind of internal heating method). On the contrary, an electric heater arranged in the surface layer of the drum was energized for heating only in the heating region (internal embedded heating method). On the other hand, in the region after the PET melt reaching position, 40° C. cooling water was fed to cool the surface of the drum in the region where PET was kept in contact.

The above cooling medium adopts a combination of three heating methods; external heating method, internal heating method and internal embedded heating method.

The drum was a black chromium plated roll as specular as 0.1 μm in maximum roughness Ry and with a diameter of 2 m.

In the following examples, the casting drum always adopted this combination of heating methods.

The cast film thus obtained had a thickness of 150 μm and was small in the irregulatiry of thickness, excellent in flatness, free from surface defects and amorphous. In succession, the cast film was stretched to 5 times at a stretching temperature of 98° C. by a roll type longitudinal multi-step stretching machine and cooled to lower than Tg, and the longitudinally oriented film was introduced into a tenter while being held at both the edges by clips, stretched to 4.3 times in the transverse direction in hot air atmosphere heated to a stretching temperature of 100° C., heatset with the length kept constant at 220° C., and heatset at a relaxation of 3% in the transverse direction at 150° C., to obtain a 12 μm thick biaxially oriented laminated polyester film. It was wound at a high speed of about 500 m/min in a stable state without being broken.

The film thus obtained was free from surface defects at all and excellent in flatness.

EXAMPLES 2 TO 4

Comparative Example 1

One hundred and fifty micrometer thick cast films were obtained as described in Example 1, except that the surface temperature of the drum in the region immediately before casting was set at 45 to 125° C. instead of 105° C. (45° C. in Comparative Example 1, 79° C. in Exmaple 2, 94° C. in Example 3 and 125° C. in Example 4). The results are shown in Table 1.

It can be seen that unless the surface temperature of the drum in the region where the melt contacts is not lower than the Tg (69° C.) of PET, preferably Tg+10° C. or more, more preferably Tg+25° C. or more, a uniform cast film cannot be obtained.

TABLE 1

|  | Surface temperature of casting drum (° C.) | Casting states | | |
| --- | --- | --- | --- | --- |
|  |  | Adhesiveness between cast film and drum | Film surface | Separatability between cast film and drum |
| Comparative Example 1 | 45 | x | x | ◯ |
| Example 2 | 79 | ◯ | Δ | ◯ |
| Example 3 | 94 | ◯ | ◯ | ◯ |
| Example 1 | 105 | ◯ | ◯ | ◯ |
| Example 4 | 125 | ◯ | ◯ | ◯ |

Comparative Example 2

When it was attempted to produce cast films as described in Example 1, except that the surface temperature of the drum at the position where PET was separated from the drum was kept at 75° C. to 105° C. higher than the Tg of PET, instead of being kept at 45° C., it was difficult to separate the cast film from the drum in every case.

EXAMPLES 5 AND 6

Comparative Examples 3 and 4

The polyesters used were polyethylene terephthalate (PET) (0.65 in intrinsic viscosity [η], 69° C. in Tg, 125° C. in cold crystallization temperature Tcc, 265° C. in melting point Tm, 210° C. in Tmc, 56° C. in ΔTcg and 55° C. in ΔTmmc) and quickly crystallized PET (PET with an intrinsic viscosity [η] of 0.45 modified at the ends into Na salt obtained by adding sodium carbonate to PET and melt-extruding the mixture, containing 0.1 wt % of spherical silica with an average grain size of 0.2 μm as an additive; 69° C. in Tg, 94° C. in cold crystallization temperature Tcc, 265° C. in melting point Tm, 235° C. in Tmc, 25° C. in ΔTcg and 30° C. in ΔTmmc).

The PET and the quickly crystallized PET were dried to 20 ppm or less in water content, supplied into melt extruders of 250 mm and 40 mm in screw diameter, molten at 285° C., filtered through fiber metal filters for removing foreign matters of not smaller than 7 μm and 2 μm respectively, fed through a laminator for laminating in three layers of quickly crystallized PET/PET/quickly crystallized PET, introduced into a T die, to extrude a three-layer melt as a film.

While electrostatic charges were applied to the extruded film, the film was cast with the drum temperature changed in a range of 25° C. to 85° C. and with the drum surface speed changed in a range of 50 m/min to 100 m/min, to obtain 150 μm thick laminate films consisting of 2.5 μm/145 μm/2.5 μm in layer thickness.

The drum used was a chromium plated roll as specular as 0.1 μm in maximum roughness Ry and with a diameter of 2 m. The melt was taken up (at a draw-down ratio of 10) in contact with the drum, to be cooled and solidified.

Each of the extruded laminate films was stretched to 5 times at a stretching temperature of 103° C. by a roll type longitudinal multi-step stretching machine and cooled to lower than Tg. In succession, the longitudinally stretched film was introduced into a tenter while being held at both the edges by clips, stretched to 4.3 times in the transverse direction in hot air atmosphere heated to a stretching temperature of 105° C., heatset with the length kept constant at 220° C., and heatset at a relaxation of 3% in the transverse direction at 150° C., to obtain a 12 μm thick biaxially oriented laminate polyester film. It was wound at a high speed of 500 m/min in a stable state without being broken.

The properties of the films thus obtained were evaluated. Casting conditions and the evaluation results are shown in Table 2. Results obtained at a casting speed of 50 m/min are shown on the left side in each column, and those of 100 m/min, on the right side. As can be seen from Table 2, when the casting drum temperature was higher than Tg, preferably higher than 80° C., films could be obtained at a high speed of 500 m/min with excellent stretching stability. The 12 μm thick films obtained were excellent in thermal dimensional stability.

TABLE 2

|  | Drum temperature (° C.) | Degree of crystallization of surface layer (%) | Casting states | | Heat shrinkage (%) |
|---|---|---|---|---|---|
|  |  |  | Adhesiveness between cast film and drum | Separability between cast film and drum |  |
| Comparative Example 3 | 23 | 0/0 | ○/× | ○/○ | 1.8/0.5 |
| Comparative Example 4 | 50 | 0/0 | ○/× | ○/○ | 1.5/0.5 |
| Comparative Example 5 | 70 | 12/8 | ○/Δ | ○/Δ | 1.0/0.4 |
| Comparative Example 6 | 85 | 21/16 | ○/○ | ○/○ | 0.5/0.3 |

Note 1:
Results obtained at a casting speed of 50 m/min are shown on the left side in each column, and those of 100 m/min, on the right side.
Note 2:
As for the heat shrinkage, the values in the machine direction at a casting speed of 50 m/min are shown on the left side in each column, and those in the transverse direction, on the right side.

Comparative Examples 5 to 8

Casting was effected as described in Examples 5 to 6 and Comparative Examples 3 and 4, except that only a 150 μm thick single-layer film made of PET without the quickly crystallized PET laminated on both sides was used instead of the three-layer laminate film.

It can be seen that if the quickly crystallized polymer is not laminated on the PET film at least on the side in contact with the drum, the film cannot be separated from the drum.

TABLE 3

|  | Drum temperature (° C.) | Degree of crystallization of surface layer (%) | Casting states | |
|---|---|---|---|---|
|  |  |  | Adhesiveness between cast film and drum | Separability between cast film and drum |
| Comparative Example 5 | 23 | 0/0 | ○/× | ○/○ |
| Comparative Example 6 | 50 | 0/0 | ○/× | Δ/Δ |
| Comparative Example 7 | 70 | 15/7 | ○/Δ | Not separatable |
| Comparative Example 8 | 85 | —/— | ○/○ | Not separatable |

EXAMPLES 7 AND 8

Comparative Examples 9 and 10

Quickly crystallized PET was used. The quickly crystallized PET was PET with 5 mol % of sodium p-phenolsulfonate copolymerized obtained by using magnesium acetate as an ester interchange catalyst, and was 0.58 in intrinsic viscosity [η], 65° C. in Tg, 105° C. in cold crystallization temperature Tcc, 260° C. in melting point Tm, 235° C. in Tmc, 40° C. in ΔTcg and 25° C. in ΔTmmc.

The quickly crystallized PET was dried to a water content of lower than 20 ppm, supplied into a melt extruder with a screw diameter of 150 mm, molten at 285° C., filtered by a fiber metal filter for removing foreign matters of not smaller than 15 μm, and introduced into a T die. While electrostatic charges were applied to the melt, the melt was cast at a drum surface speed of 90 m/min with the drum temperature changed in a range of 25° C. to 120° C., to obtain 80 μm thick films.

The casting drum used was a chromium plated roll as specular as 0.1 μm in maximum roughness Ry=0.1 μm and with a diameter of 2.3 m. The melt was taken up (at a draw-down ratio of 10) in contact with the drum, to be cooled and solidified. Each of the extruded films was stretched to 4.8 times at a stretching temperature of 118° C. by a roll type longitudinal multi-step stretching machine and cooled to lower than Tg. In succession, the longitudinally oriented film was introduced into a tenter while being held at both the edges by clips, stretched to 4.3 times in the transverse direction in hot air atmosphere heated to a stretching temperature of 115° C., heatset with the length kept constant at 220° C., and heatset at a relaxation of 2% in the transverse direction at 150° C., to obtain a 6 μm thick biaxially oriented polyester film. It was wound at a high speed of more than 400 m/min in a stable state without being broken.

The casting conditions and the properties of the films thus obtained are shown in Table 4. When the casting drum temperature was higher than Tg, preferably 85° C. or higher, films could be obtained at a high speed of 400 m/min with excellent stretching stability. The obtained 6 μm thick films were excellent in thermal dimensional stability and high in rigidity.

TABLE 4

|  | Drum temperature (° C.) | Degree of crystallization of surface layer (%) | Casting states | | Heat shrinkage (%) | Young's modulus (kg/mm²) |
|---|---|---|---|---|---|---|
|  |  |  | Adhesiveness between cast film and drum | Separability between cast film and drum |  |  |
| Comparative Example 9 | 25 | 0/0 | × | ○ | 1.3/0.4 | 480/420 |
| Comparative Example 10 | 55 | 0/0 | × | ○ | 1.0/0.3 | 495/420 |
| Example 7 | 85 | 0.2/0.1 | ○ | ○ | 0.3/0.1 | 530/440 |
| Example 8 | 120 | 1.1/0.8 | ○ | ○ | 0.1/0.1 | 620/510 |

EXAMPLE 9

The polyesters used were polyethylene terephthalate (PET) and quickly crystallized ethylene propylene copolymer (EPC).

The former polyethylene terephthalate (PET) was 0.71 in intrinsic viscosity [η], 69° C. in Tg, 132° C. in cold crystallization temperature Tcc, 263° C. in melting point Tm, 200° C. in Tmc, 63° C. in ΔTcg and 63° C. in ΔTmmc.

The latter ethylene propylene copolymer (EPC) had 7 wt % of ethylene copolymerized, and contained 0.5 wt % of antioxidant Irganox and 0.1 wt % of calcium stearate as additives, being 0° C. in Tg, 24° C. in cold crystallization temperature Tcc, 135° C. in melting point Tm, 100° C. in Tmc, 24° C. in ΔTcg and 35° C. in ΔTmmc.

The PET was dried to a water content of less than 20 ppm, and supplied into an extruder with a screw diameter of 250 mm. The EPC was supplied into an extruder of 40 mm. They were molten at 285° C., filtered by fiber metal filters for removing foreign matters of not smaller than 12 μm and 20 μm respectively, fed through a laminator for laminating three layers of quickly crystallized EPC/PET/quickly crystallized EPC, and introduced into a T die, to extrude the three-layer melt as a film. While electrostatic charges were applied to the film, the film was cast at a casting drum temperature of 110° C. at a drum speed of 120 m/min, to obtain a 306 μm thick laminate film consisting of 5.5 μm/295 μm/5.5 μm in layer thickness.

The drum used was a chromium plated roll as specular as 0.1 μm in maximum roughness Ry and with a diameter of 2.5 m. The melt was taken up (at a draw-down ratio of 7) in contact with the drum, to be cooled and solidified.

The extruded laminate film was stretched to 4 times at a stretching temperature of 90° C. by a roll type longitudinal multi-stel stretching machine and cooled to lower than Tg, and in succession, the longitudinally oriented film was introduced into a tenter while being held at both the edges by clips, stretched to 4.5 times in the transverse direction in hot air atmosphere heated to a stretching temperature of 100° C., heatset with the length kept constant at 220° C., and heatset at a relation of 3% in the transverse direction at 150° C. Both the surface layers of the laminate film were separated, to obtain a 20 μm thick biaxially oriented PET film. It was wound at a high speed of 480 m/min in a stable state.

The properties of the film obtained are shown in Table 5. The film could be obtained at a high speed of about 500 m/min with excellent stretching stability.

The obtained 20 μm thick film was excellent in thermal dimensional stability.

TABLE 5

| Evaluation item | Result |
| --- | --- |
| Film surface | Good without any crater, etc. |
| Surface roughness Ry (μm) | 0.2/0.2 |
| Heat shrinkage (%) | 0.9/0.3 |
| Haze (%) | 1.2 |
| Thickness irregularity (%) | 6/5 |

EXAMPLE 10

Two laminate films obtained by overlaying a film equivalent to the cast film of Example 6 on one side of the cast film of Example 6 were supplied into a sequential biaxially stretching machine as described in Example 2, to efficiently produce two respectively 12 μm thick biaxially oriented films all at once. The properties of the two films obtained were almost as good as those shown in Table 2.

EXAMPLE 11

Quickly crystallized PET/S was used, and as an ordinary polyester, polyethylene terephthalate (PET) (0.68 in intrinsic viscosity [η], 69° C. in Tg, 132° C. in cold crystallization temperature Tcc, 261° C. in melting point Tm, 200° C. in Tmc, 63° C. in ΔTcg and 61° C. in ΔTmmc) was used.

The former quickly crystallized PET/S had 20 mol % of sebacic acid copolymerized using manganese acetate as an ester interchange catalyst, and was 0.48 in intrinsic viscosity [η], 35° C. in Tg, 70° C. in cold crystallization temperature Tcc, 175° C. in melting point Tm, 125° C. in Tmc, 35° C. in ΔTcg and 50° C. in ΔTmmc.

The latter polyethylene terephthalate (PET) was 0.68 in intrinsic viscosity [η], 69° C. in Tg, 132° C. in cold crystallization temperature, 261° C. in melting point Tm, 200° C. in Tmc, 63° C. in ΔTcg and 61° C. in ΔTmmc.

The PET and PET/S were dried to a water content of less than 20 ppm respectively, supplied into extruders of 250 mm and 45 mm in screw diameter, molten at 285° C. respectively, filtered by a fiber metal filter for removing foreign matters of greater than 12 μm and a fiber metal filter for removing foreign matters of greater than 8 μm, fed through a laminator for laminating three layers of quickly crystallized PET/PET/quickly crystallized PET, and introduced into a T die, to extrude the three-layer melt as a film. While electrostatic charges were applied to the film, the film was cast at a casting drum temperature of 120° C. at a drum speed of 105 m/min, to obtain a 210 μm thick laminate film consisting of 3.5 μm/203 μm/3.5 μm in layer thickness.

The casting drum used was a chromium plated roll as specular as 0.1 μm in maximum roughness Ry and with a diameter of 1.5 m. The melt was taken up (at a draw-down ratio of 10) in contact with the drum, to be cooled and solidified.

The extruded film was stretched to 4.8 times at a stretching temperature of 108° C. by a roll type longitudinal multi-step stretching machine and cooled to lower than Tg, and in succession the longitudinally stretched film was introduced into a tenter while being held at both the edges by clips, stretched to 4.3 times in the tranverse direction in hot air atmosphere heated to a stretching temperature of 105° C., heatset with the length kept constant at 215° C. and heatset at a relaxation of 2% in the transverse direction at 135° C., to obtain a 12 μm thick biaxially oriented polyester film. It was wound at a high speed of more than 500 m/min in a stable state without being broken.

The properties of the film thus obtained are shown in Table 6. When the casting drum temperature was set at higher than Tg, preferably near the melt crystallization temperature Tmc of the polymer, the film could be obtained at a high speed of 500 m/min with excellent stretching stability.

The obtained 12 μm thick film was excellent in thermal dimensional stability and high in rigidity.

TABLE 6

| Evaluation item | Results |
| --- | --- |
| Film surface | Good without any crater, etc. |
| Surface roughness Ry (μm) | 0.2/0.2 |

TABLE 6-continued

| Evaluation item | Results |
|---|---|
| Heat shrinkage (%) | 0.8/0.3 |
| Haze (%) | 0.6 |
| Thickness irregularity (%) | 5/3 |

EXAMPLE 12

As a polyester, polyethylene terephthalate (PET) was used.

The polyethylene terephthalate (PET) was 0.63 in intrinsic viscosity [η], 69° C. in Tg, 125° C. in cold crystallization temperature Tcc, 265° C. in melting point Tm, 210° C. in Tmc, 56° C. in ΔTcg and 55° C. in ΔTmmc. As a quickly crystallized polyester, polybutylene terephthalate PBT (0.55 in intrinsic viscosity [η], 40° C. in Tg, 55° C. in cold crystallization temperature Tcc, 225° C. in melting point Tm, 185° C. in Tmc, 15° C. in ΔTcg and 40° C. in ΔTmmc) was used.

As an additive, 0.1 wt % of spherical silica with an average grain size of 0.2 μm was added. The PET and PBT were dried to a water content of less than 20 ppm respectively, and 20 wt % of the PBT was mixed with the PET. The mixture was supplied into a melt extruder with a screw diameter of 250 mm, molten at 285° C., filtered by a fiber metal filter for removing foreign matters of greater than 7 μm, and introduced into a T die, to be extruded as a film. While electrostatic charges were applied to the film, the film was cast at a high drum surface speed of 120 m/min on a drum kept at 65° C. higher than the Tg of the film (40° C.), to obtain a 150 μm thick film.

The drum used was a chromium plated roll as specular as 0.1 μm in maximum roughness Ry and with a diameter of 2 m.

The extruded cast film was stretched to 4 times at a stretching temperature of 95° C. by a roll type longitudinal multi-step stretching machine and cooled to lower than Tg, and in succession the longitudinally oriented film was introduced into a tenter while being held at both the edges by clips, stretched to 4.1 times in the transverse direction in hot air atmosphere heated to a stretching temperature of 90° C., heatset with the length kept constant at 220° C. and heatset at a relaxation of 3% in the transverse direction at 150° C., to obtain a 12 μm thick biaxially oriented polyester film. The film was wound at a high speed of 480 m/min in a stable stable without being broken.

The properties of the obtained film are shown in Table 7.

As shown in Table 7, the film could be obtained at a high speed of 480 m/min with excellent stretching stability. The obtained 12 μm thick film was small in thickness irregularity and excellent in thermal dimensional stability.

TABLE 7

| Evaluation item | Result |
|---|---|
| Film surface | Good without any crater, etc. |
| Surface roughness Ry (μm) | 0.15/0.16 |
| Heat shrinkage (%) | 1.4/0.5 |
| Haze (%) | 0.8 |
| Thickness irregularity (%) | 5.5/3.5 |

EXAMPLE 13

Nylon 6 (polycapramide) with a relative viscosity ηr of 3.2 and an MO content of 0.8 wt % as a raw material (containing 0.1 wt % of ethylenebisstearylamide EBA and 0.3 wt % of colloidal silica with an average grain size of 0.5 μm as additives, of 45° C. in glass transition temperature Tg and 70° C. in crystallization temperature Tcc) was dried in hot air at 120° C., to be dehydrated, supplied into a tandem extruder of 150 mm each, molten at 285° C. in the first extruder, and cooled to 185° C. in the second extruder, for supercooled extrusion. The melt was filtered by a fiber metal filter to remove foreign matters, extrusion-molded from a T die, and brought into contact with a special cooling drum (plated with 25 μm thick black-chrome, with a surface maximum roughness Ry of 0.15 μm) rotating at a high speed of 150 m/min, to be cooled and solidifed. The surface temperature of the drum is kept at 115° C. in the region immediately before the molten Nylon 6 reaching position, and to be kept at 30–55° C. in the region immediately before the film leaving position, and the cast film was separated from the drum. The special drum was heated by using the external heating method and the internal heating method together as described in Example 1, and cooled by cooling water.

The cast film thus obtained had no air bubble etc. caught on the surface and was smooth without any shark skin. The film was supplied into a linear drive type simultaneous biaxial tenter stretching machine heated to 165° C., stretched to 2.85 times each, heatset at a relaxation of 2% in the transverse direction at 200° C. and heatset at a relaxation of 2.5% in the machine direction, to obtain a 15 μm thick biaxially oriented polyamide film. It could be wound at a high speed of about 400 m/min without being broken.

The properties of the biaxially oriented polyamide film thus obtained are shown in Table 8.

TABLE 8

| Evaluation item | Unit | Measured value |
|---|---|---|
| Young's modulus | Kg/mm$^2$ | 250/255 |
| Tensile strength | Kg/mm$^2$ | 30/30 |
| Tensile elongation | % | 95/95 |
| Heat shrinkage | % | 0.5/0.5 |
| Oxygen permeability | cc/m$^2$ 24 Hr/100 μm | 2.5 |
| Haze | % | 1.8 |

Industrial Applicability

If the method and apparatus for producing a film of the present invention is used, very high adhesive strength can be obtained. So, casting can be effected at a high speed of 80 m/min or more, preferably 100 m/min or more. In addition, the obtained film is smooth on the surface, excellent in slipperiness and thermal dimensional stability, free from the rise at the edges (high edges) at the time of casting and also excellent in thermal formability.

Therefore, the present invention can be used in the film production industry at high productivity advantageously also in cost.

When the thermoplastic resin used in the method of the present invention is, for example, a polyester resin, the obtained film can of course be used for conventional packaging application, magnetic recording application, electric application in capacitors, electric insulators, etc., graphic application and receiving paper application, and is also suitable for new film applications requiring excellent thermal dimensional stability, formability, shape stability and high toughness.

What is claimed is:

1. A method for producing a thermoplastic resin film, comprising the steps of:
    a) bringing a molten thermoplastic resin into contact with a cooling medium,
        wherein the surface temperature of the cooling medium in the region immediately before the resin reaches the cooling medium is maintained at a temperature not lower than the glass transition temperature, Tg, and not higher than the melting point, Tm, of the thermoplastic resin, and
        wherein the surface temperature of the cooling medium in the region immediately before the film leaves the cooling medium is maintained at a temperature which is lower than the glass transition temperature, Tg, of the thermoplastic resin; and
    b) cooling and solidifying the resin to produce a cast film.

2. An apparatus for producing a thermoplastic resin film, comprising a cooling medium, which contains a heater and cooler wherein the heater and cooler:
    (a) maintain the surface temperature of the cooling medium in the region immediately before a molten thermoplastic resin comes into contact with the cooling medium at a temperature not lower than the glass transition temperature, Tg, and not higher than the melting point, Tm, of the thermoplastic resin; and
    (b) maintain the surface temperature of the cooling medium in the region immediately before the film leaves the cooling medium at a temperature which is lower than the glass transition temperature, Tg, of the thermoplastic resin.

3. An apparatus for producing a thermoplastic resin film, according to claim 2, wherein an external heater is installed for heating the surface of the cooling medium in the region from the point immediately after the thermoplastic resin film leaves the cooling medium to the point immediately before the melt reaches the cooling medium.

4. An apparatus for producing a thermoplastic resin film, according to claim 2, wherein said external heater employs light irradiation, energization, heating heat carrier, dielectric heating, or combustion gas, alone or in combination.

5. An apparatus for producing a thermoplastic resin film, according to claim 2, wherein the maximum surface roughness, Ry, of the surface of the cooling medium is 0.4 μm or less.

6. An apparatus for producing a thermoplastic resin film, according to claim 2, wherein the surface material of the cooling medium has a thermal conductivity of 2 W/mK to 60 W/mK.

7. An apparatus for producing a thermoplastic resin film, comprising a cooling medium, which contains a heater and cooler, wherein the heater and cooler:
    (a) maintain the surface temperature of the cooling medium in the region immediately before a molten thermoplastic resin comes into contact with the cooling medium at a temperature not lower than the glass transition temperature, Tg, and not higher than the melting point, Tm, of the thermoplastic resin; and
    (b) maintain the surface temperature of the cooling medium in the region immediately before the film leaves the cooling medium at a temperature which is lower than the glass transition temperature, Tg, of the thermoplastic resin,
and wherein the cooling medium is coated on the surface with a material having a thermal conductivity of 2 W/mK to 20 W/mK.

8. An apparatus for producing a thermoplastic resin film, according to claim 3, wherein the distance between the surface of the cooling medium and the external heater is 1 mm to 200 mm.

9. An apparatus for producing a thermoplastic resin film, according to claim 2, wherein the cooling medium has a diameter of 1 m to 5 m.

10. An apparatus for producing a thermoplastic resin film, according to claim 2, wherein the cooling medium consists of an outer cylinder, an inner cylinder, and hollow shafts, and wherein a cooling heat carrier is fed through said hollow shafts, and wherein the clearance between the outer cylinder and the inner cylinder has seals between the outer cylinder and the inner cylinder near the position where the molten thermoplastic resin film leaves the cooling medium and near the position where the molten thermoplastic resin film reaches the cooling medium, and wherein the cooling medium contains an internal heater in the region between the positions where the molten thermoplastic resin reaches and leaves the cooling medium.

11. An apparatus for producing a thermoplastic resin film, according to claim 10, wherein the internal heater employs light irradiation, energization, a heating heat carrier, dielectric heating, or a combustion gas, alone or in combination.

12. An apparatus for producing a thermoplastic resin film, according to claim 10 or 11, wherein a heat carrier having a temperature not lower than the glass transition temperature, Tg, and not higher than the melting point, Tm, of the thermoplastic resin is fed into the cooling medium in the region between the positions where the molten thermoplastic resin reaches and where the molten thermoplastic resin leaves the cooling medium.

13. An apparatus for producing a thermoplastic resin film, according to claim 10, wherein no coolant is fed into the cooling medium in the region between the positions where the molten thermoplastic resin reaches and where the molten thermoplastic resin leaves the cooling medium.

14. An apparatus for producing a thermoplastic resin film, comprising a cooling medium, which contains a heater and cooler, wherein the heater and cooler:
    (a) maintain the surface temperature of the cooling medium in the region immediately before a molten thermoplastic resin comes into contact with the cooling medium at a temperature not lower than the glass transition temperature, Tg, and not higher than the melting point, Tm, of the thermoplastic resin; and
    (b) maintain the surface temperature of the cooling medium in the region immediately before the film leaves the cooling medium at a temperature which is lower than the glass transition temperature, Tg, of the thermoplastic resin,
and wherein heating elements are embedded in the circumferential direction inside the outer cylinder of the cooling medium at approximately equal intervals.

15. An apparatus for producing a thermoplastic resin film, comprising a cooling medium, which contains a heater and cooler, wherein the heater and cooler:
    (a) maintain the surface temperature of the cooling medium in the region immediately before a molten thermoplastic resin comes into contact with the cooling medium at a temperature not lower than the glass transition temperature, Tg, and not higher than the melting point, Tm, of the thermoplastic resin; and
    (b) maintain the surface temperature of the cooling medium in the region immediately before the film leaves the cooling medium at a temperature which is lower than the glass transition temperature, Tg, of the thermoplastic resin, and wherein the cooling medium comprises an outer cylinder, an inner cylinder and hollow rotating shafts, and wherein a liquid heat carrier is fed through both the hollow rotating shafts and the area between the outer cylinder and the inner cylinder, and wherein the cooling medium is connected to a roll installed away from the cooling medium by a belt which has a maximum surface roughness, Ry, of 0.4 µm or less, and wherein the molten thermoplastic resin film is formed on the belt.

16. An apparatus for producing a thermoplastic resin film, according to claim 15, wherein the belt is heated by an external energy source.

17. An apparatus for producing a thermoplastic resin film, comprising a cooling medium, which contains a heater and cooler, wherein the heater and cooler:
  (a) maintain the surface temperature of the cooling medium in the region immediately before a molten thermoplastic resin comes into contact with the cooling medium at a temperature not lower than the glass transition temperature, Tg, and not higher than the melting point, Tm, of the thermoplastic resin; and
  (b) maintain the surface temperature of the cooling medium in the region immediately before the film leaves the cooling medium at a temperature which is lower than the glass transition temperature, Tg, of the thermoplastic resin,
  and wherein the surface temperature of the cooling medium is raised by at least 5° C. in the region immediately before the molten thermoplastic resin reaches the cooling medium as compared to the surface temperature in the region immediately after the molten thermoplastic resin film leaves the cooling medium.

18. A method for producing a thermoplastic resin film, comprising
  a) bringing a molten thermoplastic resin into contact with a cooling medium, wherein the surface temperature of the cooling medium in the region immediately before the resin reaches the cooling medium is maintained at a temperature not lower than the glass transition temperature, Tg, and not higher than the melting point, Tm, of the thermoplastic resin;
  b) cooling and solidifying the resin to form a film; and
  (c) crystallizing the surface of the resulting film before it leaves the cooling medium by maintaining the surface temperature of the cooling medium in the region immediately before the film leaves the cooling medium at a temperature near the crystallization temperature, Tmc, of the thermoplastic resin.

19. A method for producing a thermoplastic resin film, according to claim 18, wherein the degree of crystallization of the surface layer is between about 5% and about 50%.

20. A method for producing a thermoplastic resin film, according to claim 18 or 19, wherein a crystallized resin is used, and wherein the difference, $\Delta Tcg$, between the cold crystallization temperature, Tcc, and the glass transition temperature, Tg, in the surface layer is less than or equal to 50° C.

21. A method for producing a thermoplastic resin film, according to claim 20, wherein in the crystallized resin is selected from the group consisting of resins with a metal salt at the ends of the molecular chain, resins containing a crystalline nucleating agent, very low molecular weight resins, and mixtures thereof.

22. A method for producing a thermoplastic resin film, according to claim 18, comprising:
  (a) bringing a laminate melt into contact with the cooling medium, wherein the laminate melt consists of a substrate resin film and an additional resin film having a higher crystallization rate than said substrate resin film, and wherein the resin film having a higher crystallization rate contacts the cooling medium;
  (b) cooling and crystallizing the resin; and
  (c) separating the resin film layer.

23. A method for producing a thermoplastic resin film, according to any one of claims 11, 17, 18, 19, and 22, wherein electrostatic charges are applied during casting.

24. A method for producing a thermoplastic resin film, according to any one of claims 1, 18, 19, and 22 wherein the casting occurs at a speed in the range of about 80 m/min to 300 m/min.

25. A method for producing a thermoplastic resin film, according to claim 17 wherein the thermoplastic resin is selected from the group consisting of polyesters, polyamides, polyolefins, polyphenylene sulfide, vinyl polymers, and their mixtures and modification products.

26. A method for producing a thermoplastic resin film, according to claim 25, wherein the polyester is selected from the group consisting of polyethylene terephthalate, polyethylene naphthalate, crystalline polyesters, and their mixtures and modification products.

27. A method for producing a thermoplastic resin film, according to any one of claims 1, 18, 19, 20, 25, and 26, wherein the thermoplastic resin is molten in a supercooled state.

28. A method for producing a thermoplastic resin film, according to claim 1, wherein the cast film is stretched and/or heat-treated.

29. A method for producing a thermoplastic resin film, according to claim 28, wherein the stretching is longitudinal monoaxial stretching, lateral monoaxial stretching, sequential biaxial stretching or simultaneously biaxial stretching.

* * * * *